May 6, 1930.　　　　　C. E. MAYNARD　　　　　1,757,128
MANDREL CEMENTING APPARATUS
Filed Feb. 14, 1927　　　4 Sheets-Sheet 4
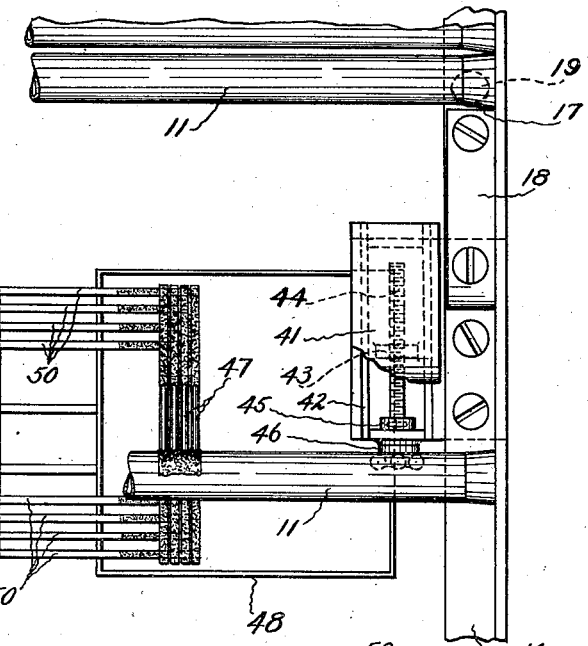
Fig. 8.
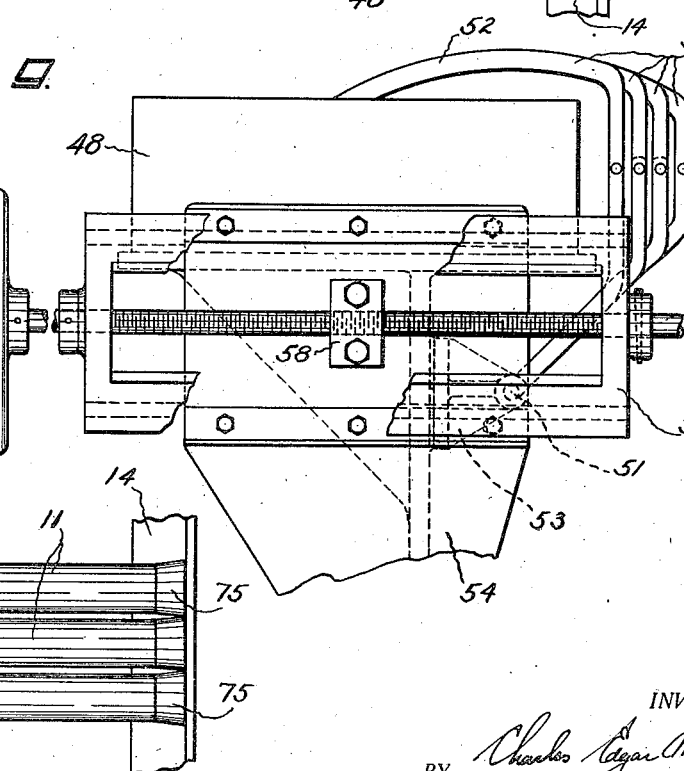
Fig. 9.
Fig. 10.
INVENTOR.
BY Charles Edgar Maynard
Edward C. Taylor
ATTORNEY.

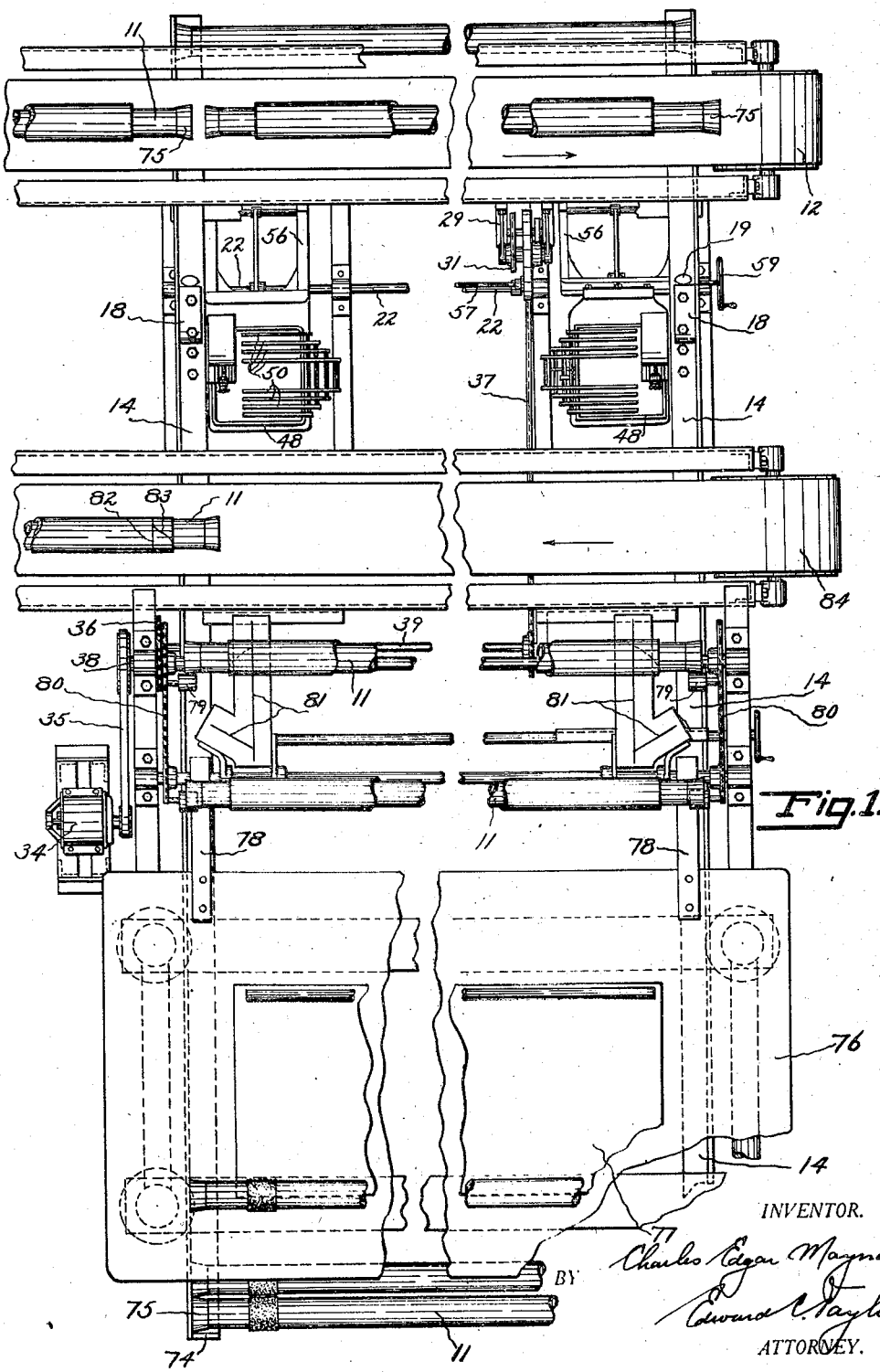

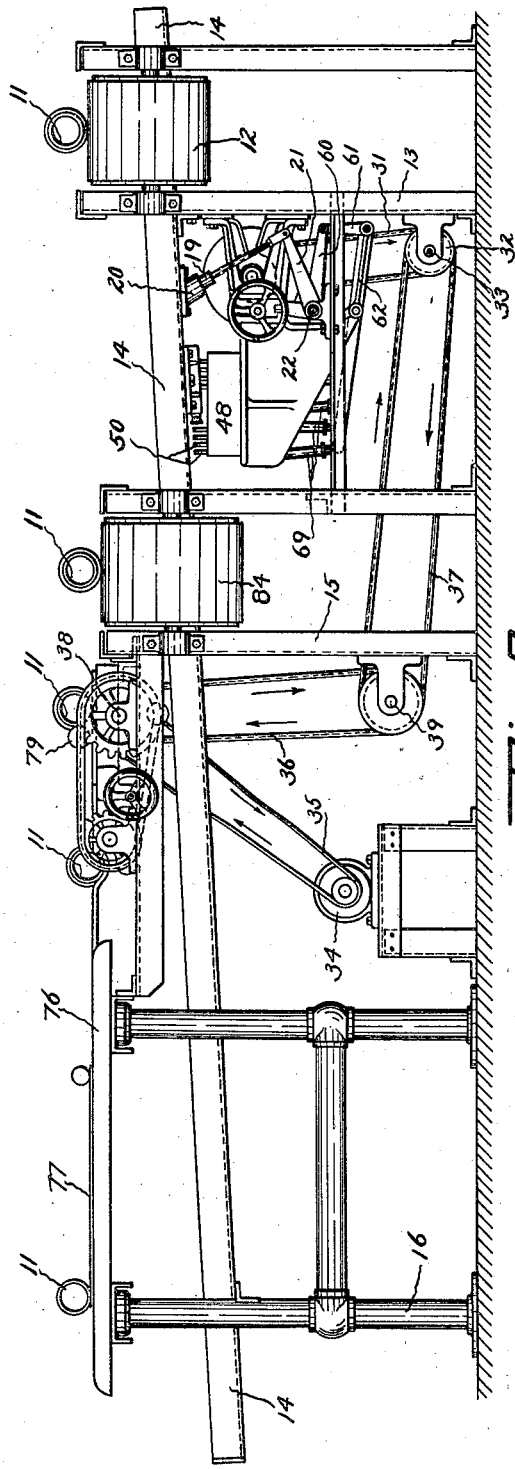

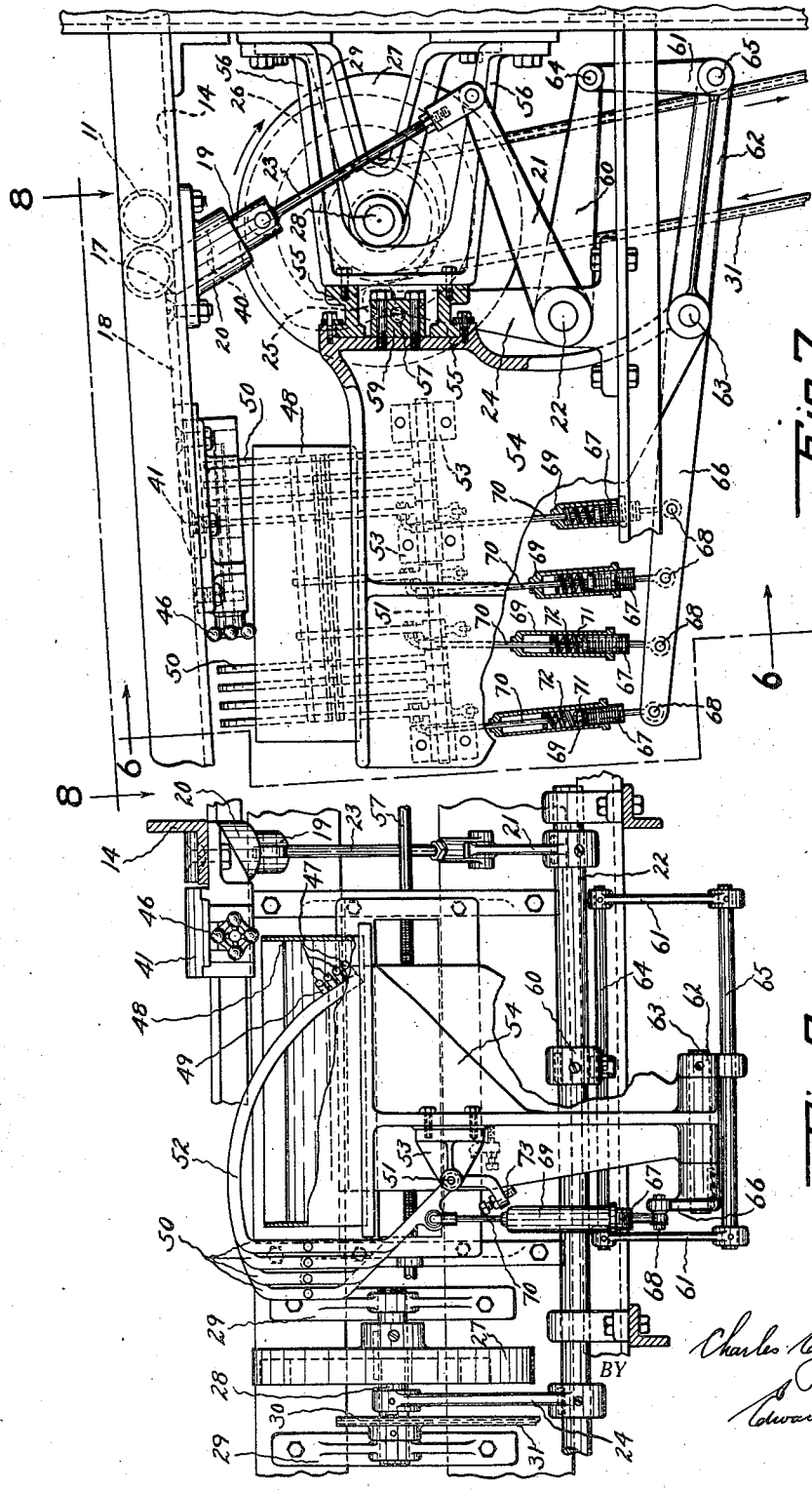

Patented May 6, 1930

1,757,128

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

MANDREL-CEMENTING APPARATUS

Application filed February 14, 1927. Serial No. 167,946.

This invention relates to apparatus for use in the manufacture of rubber tubes such as inner tubes for automobile tires, and has particular reference to apparatus for use in performing the process described in my copending application Serial No. 111,968, filed May 27, 1926.

One object of my invention is to provide an apparatus by which a plurality of mandrels may receive successively bands of cement adjacent their ends. A further object is to provide an apparatus which will apply a uniform quantity of cement to the mandrels. A further object is to provide an apparatus which will apply cement bands to the mandrels, dry the cement, and supply the cemented and dried mandrels successively for use in tube building. A further object is to provide a machine which will apply the cement to the mandrels in closely spaced strips which will merge to form wide bands. A further object is to provide an apparatus by which rubber tubes may be made expeditiously and cheaply, and without the necessity of using any external binding or sealing means for the tube ends during vulcanization. Other objects will appear from the following description and claims.

Referring to the drawings,

Fig. 1 is a top plan view of an apparatus constructed in accordance with my invention;

Fig. 2 is a side elevation thereof;

Figs. 3, 4, and 5 are details illustrating the operation of one of the cementing mechanisms;

Fig. 6 is a detail, on line 6—6 of Fig. 7, illustrating the construction of one of the cementing mechanisms;

Fig. 7 is a side elevation of one of the cementing mechanisms;

Fig. 8 is a top view of one of the cementing mechanisms, on line 8—8 of Fig. 7;

Fig. 9 is a detail of an adjusting mechanism; and

Fig. 10 is a plan view showing the manner of handling the mandrels after cementing.

The apparatus comprises generally devices for receiving the mandrels as they are delivered to the tube-building unit—as, for instance, as they are removed from a heater and the vulcanized tube stripped from them,—a cementing device for applying bands of cement to the mandrels adjacent their ends, a drying rack or conveyor which carries the cemented mandrels to a station where they are taken by the operators who are to roll the rubber stock upon them. The mandrels 11 are in the case illustrated fed to the machine upon a conveyor 12, carried in suitable bearings upon a frame 13. The mandrels are removed from the conveyor 12 by operators who strip off the vulcanized tubes and place the mandrels upon inclined trackways 14. These trackways extend completely across the various devices to be described below, and are supported by a frame 13 and by frames 15 and 16 which also carry other parts of the devices.

The mandrels roll down the trackways 14 by gravity until they meet the ends 17 of ledges 18 formed thereon (Figs. 7 and 8). At this point they rest until raised onto the ledges by plungers 19 running in bearings 20 secured to the bottoms of the trackways. At predetermined periods the plungers are raised to start a mandrel through the cycle of operations to be described. The distance between the ends of the ledges and the upper ends of the trackways is preferably great enough to allow a space for accumulation of mandrels to insure that a supply shall always be present.

The mechanism for raising the plungers 19 comprises an arm 21 for each plunger, fixed to a shaft 22 and connected to one of the plungers by a link 23. The shaft 22 is oscillated at intervals by an arm 24 fixed to it and carrying at its end a cam roll 25 running in the groove 26 of a face cam 27. A short shaft 28, carried in bearings 29 attached to frame 13, supports both the cam 27 and a sprocket 30 by which it is driven, motion being given to the sprocket 30 by a chain 31 passing also around a sprocket 32 on a stub shaft 33 (Fig. 2). By means of a motor 34; chains 35, 36, and 37; and suitable sprockets on shafts 38 and 39; the shaft 33 is driven in synchronism with other parts of the apparatus.

As the plungers 19 are raised periodically by the mechanism described, their concave upper surfaces 40 contact with the mandrel which is resting against the ends 17 of ledges 18, and lifts it onto the ledges. The mandrel then rolls down the ledges, being slightly elevated from the trackway. Beside each of the ledges 18 are adjustable ledges 41 having curved ends 42 which deposit the mandrels easily upon the surface of the trackways. As shown in Fig. 8, each of the ledges 41 is mounted in slideways 42 and is fitted with a depending threaded lug 43 through which passes a screw 44. A collar 45 holds the screw from endwise movement in one direction, and a handwheel 46 prevents it from moving oppositely. Rotation of the handwheel will thus cause the ledge 41 to be moved one way or another longitudinally of the screw. The purpose of this arrangement is to lower the mandrels onto the trackways at a point which can be predetermined in accordance with the diameter of the mandrels. The cementing apparatus to be described below presents bands of cement of a constant length, and to avoid more than a complete circumference of cement being placed upon the mandrel the latter is kept out of contact with the cementing device until such a point that the remainder of the length of the cementing device corresponds to the circumference of the mandrel.

Each cementing device is made laterally adjustable to care for different lengths of tubes (adjustment for different diameters being accomplished by the ledges 41 as above described), and is composed preferably of a plurality of spaced rods 47 which dip into a tank 48 containing rubber cement and then move into position to apply the cement to the mandrels as the latter roll down the trackway 14 off the ledges. The rods are carried by small lugs 49 (Fig. 6) on arms 50 pivoted upon a shaft 51 and having their major portions 52 formed upon the arc of a circle whose center is the pivot shaft. Shaft 51 is carried in bearings 53 attached to a large adjustable bracket 54.

Lateral adjustment of the brackets 54 (there being one of these at each side of the machine to support the cementing devices at the two ends of the mandrels) is secured by sliding them upon a casting 55 which is fastened to pedestals 56 carried upon the frame 13. A shaft 57 passes from one side of the machine to the other, being journaled in the pedestals 56, and is formed with right and left threaded portions engaging nuts 58 secured to the brackets 54. By means of a handwheel 59 on one end of the shaft the latter can be rotated to vary simultaneously the separation of the two cementing devices while maintaining them at equivalent distances from the center line of the machine.

The several cement applying rods 47 of each unit are so operated as to cause them to separate from an original close spacing on leaving the cement in order to prevent a web being formed between them and an undue amount of cement being picked up, and are subsequently again brought into close spacing before the mandrel is caused to roll over them. Their original position is shown in Fig. 3, where they are bunched sufficiently to permit their entering the comparatively shallow cement tank 48. In Fig. 4 they are shown in the process of emerging from the tank in separated position. Fig. 5 shows the final position of the rods as they apply the contiguous bands of cement to the tube mandrel.

Operation of the arms 50 is derived from the same cam 27 that actuates the plungers 19. Arms 60, one for each cementing unit, are keyed to the shaft 22 and are connected by links 61 to rocking levers 62 pivoted to the bracket 54 at 63. The two links 61 of each unit are pinned to the ends of rods 64 and 65, the former of which is pinned to arm 60 and the latter of which passes loosely through the end of lever 62. This permits a lateral movement of the cementing unit as it is adjusted by wheel 59. Secured to the pivot 63 of each lever is a second lever 66 to which is connected the individual operating units for the cement applying rods. Each of these units comprises a threaded body 67 pivoted at 68 to the lever 66, a housing 69 screwed onto the body, and a rod 70 pivoted to the arms 50. Each of these rods passes into its respective housing and has an enlarged end 71 between which and the end of the housing is located a spring 72. The space between the spring and the housing varies progressively in the several connections, as is clearly shown in Fig. 7 in order to secure the separation of the rods illustrated in Fig. 4.

The manner in which the cement rods are moved can now be considered in more detail. As the arm 24 moves to the left in Fig. 7 under the influence of cam 29 the lever 66 is lowered, drawing the housings 69 downwardly upon the rods 70. Except in the case of the one at the right end of the series shown in Fig. 7, each housing is made long enough to avoid contact with the spring 72 until after a short downward motion. The extent of this motion varies in the different housings, being chosen so that contact with the respective springs will occur progressively beginning with the right hand housing and ending with that at the left. This results in the rods 70 being started downwardly in the same progressive order. The action produced upon the arms 50 and the cement applying rods 47 is shown in Fig. 4, where it is apparent that the rods are separated from their originally closely spaced positions and are in the course of being moved upwardly. As this upward motion proceeds set screws 73 carried by extensions of arms 50 strike against the bracket 54 and stop the arms individually and successively in the closely spaced position of Fig. 5, ready to apply their coating of cement to a mandrel. Further downward motion of the housings 69 causes a compression of springs 72 with no corresponding motion being given to the rods 47. This series of motions allows the rods to pick up a coating of cement, drain the cement while in separated positions, and apply the cement to a mandrel 11 while again closely spaced.

As the rods near the position of Fig. 5 the plungers 19 are rising, and when the rods are finally ready to receive a mandrel the plunger has gone high enough to raise one over the shoulder 17. The mandrel then runs down ledges 18 and 41, dropping off the curved end of the latter at the correct place to roll over the rods 47 and pass off their ends after having made exactly one revolution in contact with the cement strips. Tracks 14 are so arranged relative to the cement applying rods 47 that the mandrels do not make contact with the rods themselves but with the cement film only. The mandrels after having picked up the cement bands roll down tracks 14 and pile up against ledges 74 at their lower end (Fig. 1). A suitable mandrel separating device may be installed at this point if desired, but a single solution of the problem of keeping the cemented areas of adjacent mandrels out of contact is to provide the mandrels with enlarged ends 75. When the mandrels strike one another these ends prevent contact of the mandrel bodies or of the cement material upon them.

Above the lower end of trackway 14 is a tube rolling table 76 upon which the sheet rubber stock 77 is laid. When the operator is ready to start the rolling of a tube he picks up the lowermost mandrel in the trackway and places it upon the edge of the rubber sheet. A sufficient number of cemented mandrels are kept in the trackway at all times so that by the time one of them is taken out the cement has dried. During this storage period the cement first spreads laterally to form an even coating and then loses most of its volatile constituent. Although dry, the cement does not lose its tackiness and adheres firmly to the rubber sheet as the latter is rolled upon the mandrel.

As the rolling is completed the mandrel is pushed onto a trackway 78 where it is taken by pushing rollers 79 on conveyors 80 and carried over electrically heated knives 81 which trim the tube to length. The cut which trims the tube is preferably made just inside the outer edge of the cement, so that the extreme end of the trimmed tube will firmly adhere to the mandrel. Beyond the straight trimming cut 82 a spiral cut 83 is made in order to facilitate the removal of the excess rubber at the end of the tube. The pushers 79 deposit the mandrels successively on a belt conveyor 84 which carries the mandrel and tube to a point where the excess rubber can be pulled off and the mandrels loaded into a vulcanizer.

Having thus described my invention, I claim:

1. In a mandrel cementing machine, a cement tank, a plurality of cement carrying rods, means for shifting the rods from the tank to position to transfer cement to the mandrel, and means for separating the rods from each other during the period of shifting.

2. In a mandrel cementing machine, a cement carrying surface and means for depositing a mandrel in cement-transferring rolling contact with that surface at a predetermined point intermediate the length of said surface in the direction of the travel of the mandrel.

3. In a mandrel cementing machine, a cement carrying surface, means for depositing a mandrel in cement-transferring rolling contact with that surface at a point intermediate the length of said surface in the direction of the travel of the mandrel, and a device for adjusting the position of the point of contact.

4. In a mandrel cementing machine, an inclined trackway, a cementing device, a mandrel stop on the trackway above said device, means for causing said device to present a film of cement to be picked up by a mandrel rolling down the trackway, and means actuated in timed relation therewith for releasing a mandrel.

5. In a mandrel cementing machine, a cement tank, a plurality of cement carrying rods, supporting devices for carrying the rods in an arcuate path out of the tank into a position to present the picked-up cement to a mandrel, and means for separating the rods temporarily during said arcuate movement.

CHARLES EDGAR MAYNARD.